Feb. 24, 1959 M. DUCATI 2,874,609
MOUNTING ARRANGEMENT FOR SPECTACLE SIDE PIECES
Filed March 2, 1955
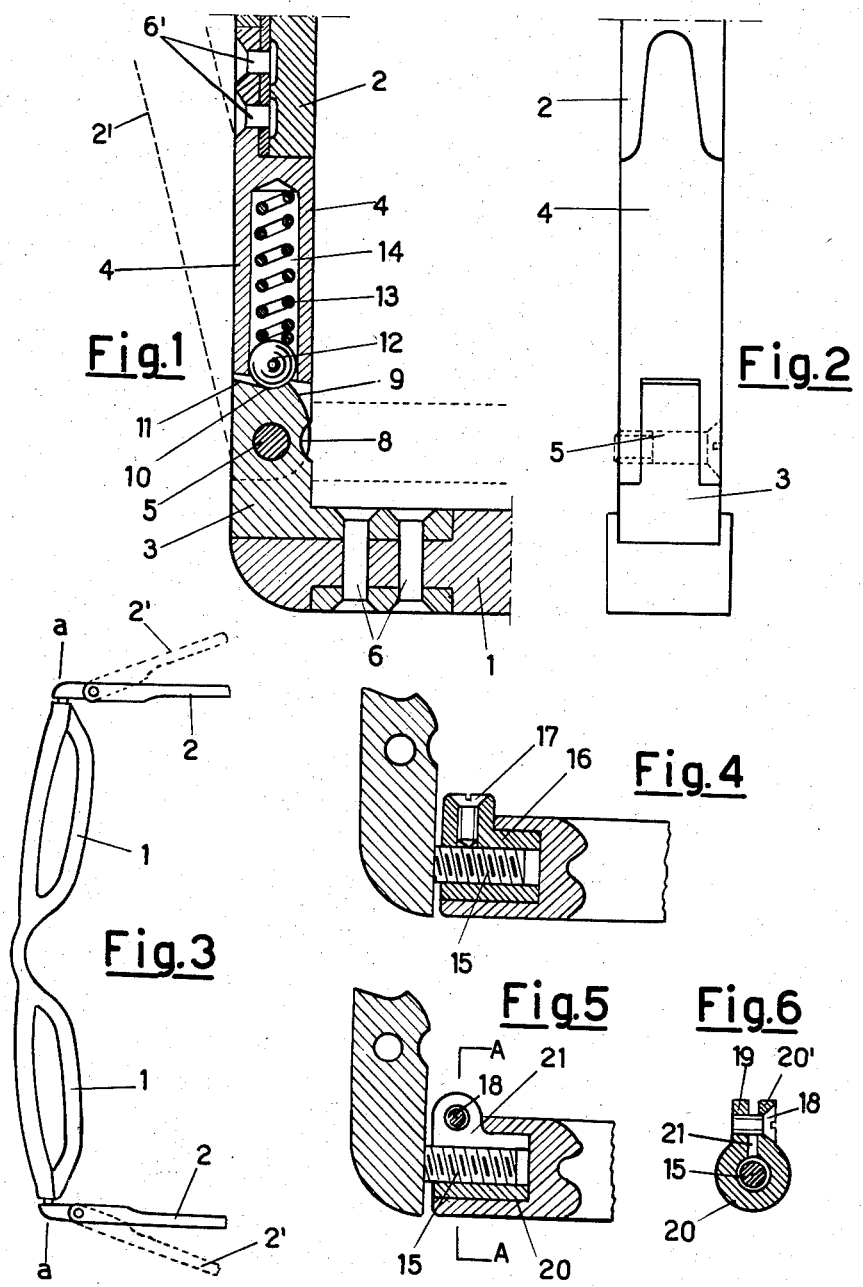
INVENTOR.
Marcello Ducati
BY
Michael S. Striker United States Patent Office 2,874,609
Patented Feb. 24, 1959

2,874,609

MOUNTING ARRANGEMENT FOR SPECTACLE SIDE PIECES

Marcello Ducati, Milan, Italy

Application March 2, 1955, Serial No. 491,594

4 Claims. (Cl. 88—53)

It is known that in common frames for spectacles provided with tiltable sticks, the aim is to impart to said sticks the necessary springiness by making them partly or totally of elastic material. This is a limitation not only in the choice of materials suitable for frame manufacture, but often involves complicated and costly work.

It has been found now that it is possible to make frames with completely rigid or stiffened sticks and to impart the required springiness to them by connecting each stick to the frame by means of a hinge the opening of which is contrasted from a certain angle onward by an elastic member of the hinge, whence the spreading of the sticks becomes springed from said angle onward.

Hence the present invention provides a frame for spectacles with tiltable sticks, characterized in that each stick even if substantially rigid or stiffened, is connected to the frame by means of a hinge formed by two members rotatable about a common pin, one of said members being provided with an elastic member projecting in such a manner as to be able to engage and to slide against a surface belonging to the other member, shaped in such a way as to contrast elastically the sliding of said projecting member and, therefore, to make the spreading of the stick in respect of the frame springy only from a predetermined angle of aperture onward.

According to one of the preferred embodiments of the invention, one of the members of the hinge is terminated with a cam-shaped surface with which there cooperates an elastic tappet inserted in the other member, the profile of the cam being eccentric in respect of the pin of the hinge and having at least one dead point position in correspondence with the angle of normal aperture or spreading as predetermined and a subsequent section with growing eccentricity which permits further opening or spreading in contrast with the elastic member of the tappet.

Preferably the tappet is constituted by a simple ball (or roller) subjected to the action of a compression helical spring housed and guided in a special bore provided in one of the hinge members.

It is another object of the invention to render the tilting of the sticks automatical and stable in closing. To this end, the cam may have between the aforesaid dead point position and the closing position a profile with decreasing eccentricity in such a manner that once the dead point has been overcome, the tappet is urged automatically to run along said profile taking the stick to its closing position.

Further objects of the invention will appear from the following description with reference to some of the possible embodiments illustrated merely by way of example without limitation, in the accompanying drawing wherein:

Fig. 1 represents a partial sectional view of a stick connected to the front piece of the frame according to the invention;

Fig. 2 represents a side view and

Fig. 3 represents a plan view of the frame with the sticks in normal dead point position (solid lines) and in a position of further and springed spreading (dotted lines);

Fig. 4 represents a section of the connection of a hinge member to the front piece of the frame by means of a threaded pin and locking screw;

Fig. 6 and Fig. 6 represent respectively in longitudinal and cross-section a variant of Fig. 4.

The spectacle frame is formed by the front piece 1 and by the two rigid sticks 2 each of which is connected to the front piece 1 by means of a hinge formed by two members 3—4 rotatable about the pin 5 and fixed respectively to the front piece and to the stick with the rivets 6—6'. The member 3 is terminated with a cam-shaped surface 8—9—10—11 against which there bears a tappet constituted by a ball 12 pushed by the spring 13 both housed and guided in the bore 14 provided in the other member 4 of the hinge. The profile of the cam has at 10 a dead point position corresponding to the predetermined position of normal aperture (e. g. as represented with solid lines in Figures 1–3). From said dead point position onward, the profile of the cam has a section 11 with eccentricity decreasing outwards, while it has a section 9 with eccentricity decreasing inwards.

For instance, from the opening position onwards which is represented with solid lines in Figures 1–3, the sticks 2 may be stressed to spread further until reaching a position 2', but it is evident that owing to the shape of the profile 11, the tappet reacts elastically to said spreading and tends to take the stick again towards the dead point position 10, so that between the positions 2—2' the sticks behave as if they were elastically flexible themselves.

If, instead, the stick is stressed from the dead point 10 onward to tilt inwards, the ball 12 is stressed, as soon the dead point 10 is passed over, to roll automatically along the section 9 of the cam until attaining the second dead point 8.

Of course, the positions of the two hinge-members 3—4 may be exchanged, the one 3 being applied to the stick (instead of the front piece) and the other one 4 to the front piece (in lieu of the stick). Moreover, the hinge member 3 (or 4) to be applied to the front portion, may be fixed by means of a threaded pin 15 rigidly therewith, which is screwed into a female-threaded bush or nut 16 fixed to the frone-piece 1, said threaded pin 15 being locked up in its required position by means of a locking screw 17 which is screwed into the nut-bush 16 in a direction normal to the axis of the pin 15 (Fig. 4) or by means of a locking screw 18 which tends to tighten against each other the jaws 19—20' of the bush 20, which has a longitudinal slot 21 (Fig. 6).

If the threaded pins 15 to be applied at the two sides of the front-piece 1 are provided on the same cross-axis a—a contained in the plane of the front-piece, it is clear that the plane of the front-piece can be oriented (that is to say, inclined more or less) in respect to the plane containing the sticks, with the advantage that the frame can be adapted to the various configurations of the heads of people.

Of course the invention may be put to practice with embodiments different from those described without departing from the scope of the invention. For instance, the profile of the cam may be limited only to the section comprised between the position of normal spread (dead point 10) and the position of maximum spread; the tappet may be formed by one single elastic member (a piece of springing steel wire) in such a manner as to co-operate with the profile of the cam only along the above-mentioned active section.

I claim:

1. A mounting arrangement for mounting a side piece member to a spectacle frame member comprising, in combination, a mounting end portion on one of said members; a mounting end portion on the other of said members; means pivotally connecting said mounting end portions for turning movement thereof about a turning axis between an open spectacle position and a closed spectacle position; cooperating detent means on said end portions tending to hold said end portions in an open spactacle position; cam engaging means on one of said end portions, said cam engaging means having a cam follower surface of a low coefficient of friction; spring bias means for urging said cam engaging means in a direction normal to said turning axis; and cam means on the other of said end portions having a radially facing cam surface engaged by said surface of said cam engaging means during movement of said end portion from open spectacle position into closed spectacle position, said cam surface decreasing, in a plane normal to said turning axis, in radial distance from said turning axis between the point of said cam surface engaged by said cam engaging means in said open spectacle position to the point of said cam surface engaged by said cam engaging means in said closed spectacle position, whereby upon disengagement of said cooperating detent means said cooperating cam surface and cam engaging means will tend to turn said end portions from their open spectacle position into their closed spectacle position.

2. An arrangement as set forth in claim 1, wherein one element of said detent means is a recessed portion formed in said cam surface, said cam engaging means being located in said one of said end portions in a position registering with said recessed portion when said end portions are in their open spectacle position so that said cam engaging means will act as an element of said detent means and hold said one end portion, under the action of said spring bias means, by engagement with said recessed portion, said cam engaging means being a rotatable element mounted in said one end portion operatively connected with said spring bias means for being urged towards said cam surface while rolling therealong during said turning movement of said end portions relative to one another.

3. An arrangement as set forth in claim 1, wherein one element of said detent means is a recessed portion formed in said cam surface, said cam engaging means being located in said one of said end portions in a position registering with said recessed portion when said end portions are in their open spectacle position so that said cam engaging means will act as an element of said detent means and hold said one end portion, under the action of said spring bias means, by engagement with said recessed portion, said recessed portion in said cam surface being formed with a retaining shoulder terminating said recessed portion in the direction of movement of said one end portion toward said closed spectacle position, the rest of said recessed portion extending in opposite direction being a second cam surface increasing, in said plane and in said opposite direction, in radial distance from said turning axis so that if said one end portion is turningly moved in said opposite direction beyond said open position defined by engagement of said cam engaging means with said shoulder, said cooperating cam engaging means and said second cam surface will tend to turn said one end portion towards said open spectacle position.

4. An arrangement as set forth in claim 1, wherein one element of said detent means is a recessed portion formed in said cam surface, said cam engaging means being located in said one of said end portions in a position registering with said recess portion when said end portions are in their open spectacle position so that said cam engaging means will act as an element of said detent means and hold said one end portion, under the action of said spring bias means, by engagement with said recessed portion, said cam surface being formed with a second recessed portion located so as to be engaged with said cam engaging means when said end portions are in said closed spectacle position and to be resiliently held in such position.

References Cited in the file of this patent

UNITED STATES PATENTS 2,098,921　　Mandaville _____ Nov. 9, 1937

FOREIGN PATENTS 381,604　　Great Britain _____ Oct. 10, 1932
419,466　　Great Britain _____ Nov. 13, 1934
403,149　　Italy _____ Apr. 6, 1943

UNITED STATES PATENT OFFICE

CERTIFICATE OF CORRECTION

Patent No. 2,874,609                                              February 24, 1959

Marcello Ducati

It is hereby certified that error appears in the above numbered patent requiring correction and that the said Letters Patent should read as corrected below.

In the heading to the printed specification, between lines 5 and 6, insert -- Claims priority, application Italy March 13, 1954 --.

Signed and sealed this 11th day of August 1959.

(SEAL)
Attest:

KARL H. AXLINE                                                   ROBERT C. WATSON
Attesting Officer                                           Commissioner of Patents